Figure 1:
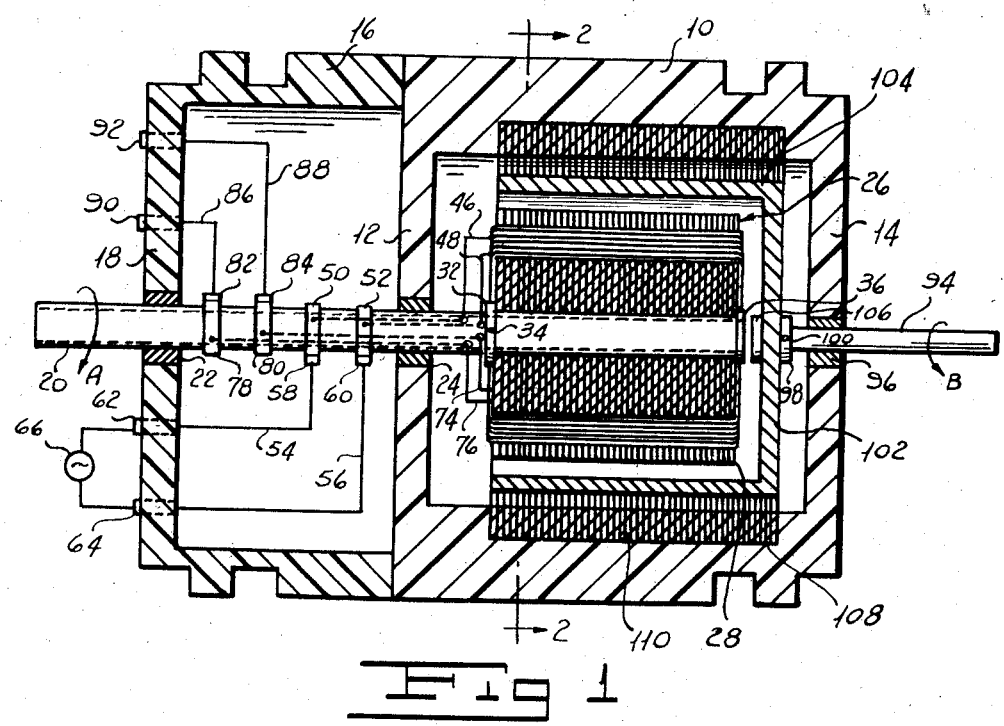

July 21, 1959        C. LASKIN        2,896,101

DIFFERENTIAL TACHOMETER

Filed May 3, 1957

INVENTOR
CARL LASKIN
BY
*Henry L. Shenier*
ATTORNEY

2,896,101
DIFFERENTIAL TACHOMETER
Carl Laskin, Kew Gardens Hills, N.Y., assignor, by mesne assignments, to United Aircraft Corporation, East Hartford, Conn., a corporation of Delaware
Application May 3, 1957, Serial No. 656,877
9 Claims. (Cl. 310—171)

My invention relates to a differential tachometer and more particularly to a differential tachometer for producing an electrical signal which is proportional to the difference in speed between two moving members.

Tachometers are known in the prior art for producing an electrical signal which is proportional to the speed of a rotating member. There are a number of instances in which it is desirable to produce an electrical signal which is proportional to the difference in speed between a pair of rotating members. For example, an electrical signal which accurately follows speed variations between the input shaft and the output shaft of a control system may be used as a control. In error-rate damping technique used to stabilize a servomechanism, the true error rate between the input and output shafts of the system is required. In the prior art, in order to determine this true error rate, two matched tachometers must be employed. The slip of a test induction motor may be determined by comparing the shaft speed of the induction motor with that of a synchronous motor. As is the case with true error rate determination, this method of determining slip requires two matched tachometers in the prior art.

I have invented a differential tachometer which produces an electrical signal proportional to the difference in speed between a pair of rotating shafts. My differential tachometer is a unitary device which performs the same functions as a pair of matched tachometers of the prior art. My tachometer may be employed to determine the true error rate in a servomechanism. The slip of an induction motor may readily be found by using my differential tachometer. My tachometer is simple and compact in construction and reliable in operation. Owing to the substantially linear output of my tachometer over a wide range of speed, I may employ my tachometer to provide an expanded-range velocity servomechanism system.

One object of my invention is to provide a differential tachometer for producing an electrical signal which is proportional to the difference in speed between two rotating members.

Another object of my invention is to provide a differential tachometer which may be employed to determine the true error rate of a servomechanism.

Still another object of my invention is to provide a differential tachometer by means of which the slip of an induction motor may readily be found.

A further object of my invention is to provide a differential tachometer which may be used in an expanded-range, velocity servomechanism system.

A still further object of my invention is to provide a differential tachometer which is unitary, compact and simple in construction.

Yet another object of my invention is to provide a differential tachometer having a substantially linear output over a wide range of speed.

Other and further objects of my invention will appear from the following description.

In general my invention contemplates the provision of a differential tachometer including a frame and a rotor rotatably carried on the frame. The rotor carries a primary winding supplied with alternating current to create a rotating magnetic field. I rotatably mount a hollow cylinder of conducting material on the support in a position at which the rotor magnetic field passes through the cylinder wall. When the rotor and the cylinder relatively rotate, the rotor magnetic field generates eddy currents in the cylinder wall. The rotor carries a secondary winding in which the magnetic fields, produced by the cylinder eddy currents, induce an electrical signal when relative rotation exists. The electrical signal generated in the secondary winding is proportional to the difference in speed between the speed of rotation of the rotor shaft and the speed of rotation of the cylinder shaft.

In the accompanying drawings which form part of the instant specification and in which like reference numerals are used to represent like parts in the several views Figure 1 is a sectional view in elevation of my differential tachometer.

Figure 2:
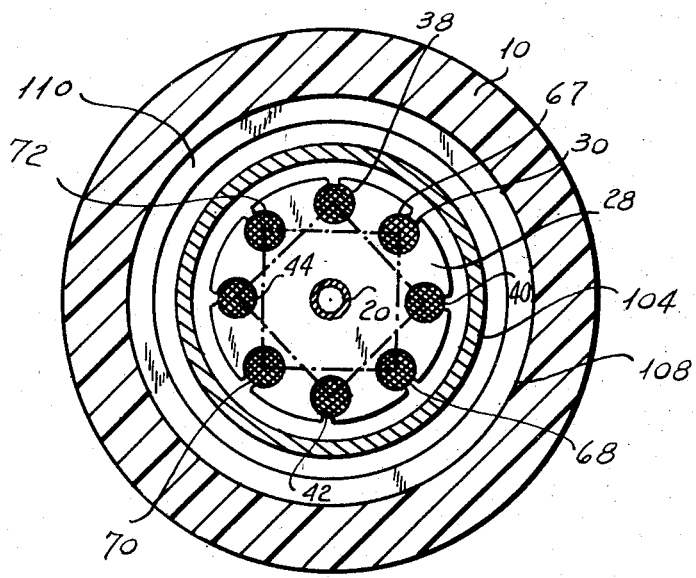

Figure 2 is is a sectional view of my differential tachometer taken along the line 2—2 of Figure 1.

Referring now more particularly to the drawings, my differential tachometer includes a housing 10 having ends 12 and 14. I secure a cylindrical casing 16 having a side 18 over the end 12 of housing 10 by any convenient means such as screws or the like (as shown).

I rotatably mount a hollow rotor shaft 20 in respective bearings 22 and 24 carried by side 18 and by the end 12 of housing 10. Shaft 20 carries for rotation with it a rotor indicated generally by the reference character 26 made up of a plurality of stacked laminations 28. Each of the laminations 28 is formed with a plurality of spaced slots 30 around its periphery for receiving the rotor windings to be described hereinafter. Any convenient means such as a collar 32 held on shaft 20 by a set screw 34 retains the stacked laminations 28 against a boss 36 formed on the end of the shaft. It is to be understood that corresponding slots 30 in the respective laminations 28 may be aligned with each other.

I dispose a first winding including respective legs 38, 40, 42, and 44 in one set of slots thus formed in rotor 26. The orientation of this winding is indicated in dot-dash lines in Figure 2. Respective conductors 46 and 48 are connected to the terminals of the winding including leg 38 and pass through suitable openings into the interior of hollow shaft 20. I connect the conductors 46 and 48 to a pair of slip rings 50 and 52 carried by shaft 20. It will be appreciated that the connections between conductors 46 and 48 and slip rings 50 and 52 are made through the wall of shaft 20. Respective conductors 54 and 56 connect brushes 58 and 60 associated with slip rings 50 and 52 to terminals 62 and 64 carried by side 18. I connect a source of alternating current potential, such as a generator 66, between terminals 62 and 64.

The remaining slots 30 in rotor 26 carry the respective legs 67, 68, 70 and 72 of a second winding, the orientation of which is indicated by dot-dash lines in Figure 2. Respective conductors 74 and 76 connected to the terminals of this second winding pass through openings into the bore of shaft 20. I connect conductors 74 and 76 to a pair of slip rings 80 and 78 carried by shaft 20. It is to be understood that in order to make these connections, I must pass the conductors through the shaft wall. Respective brushes 82 and 84 associated with slip rings 78 and 80 are connected by conductors 86 and 88 to terminals 90 and 92 in side 18.

I rotatably mount a second shaft 94 in a bearing 96 supported in the end 14 of housing 10. A collar 98 held on shaft 94 by a set screw 100 holds the base 102 of a hollow cylinder 104 against a boss 106 formed on the end of shaft 94. I form a hollow cup or cylinder 104 from an electrically conductive material.

As can be seen by reference to the drawings, the cylinder 104 surrounds rotor 26. Owing to the alternating current flowing through the first rotor winding including leg 38, a magnetic field exists in the area surrounding the rotor. I so arrange the winding including legs 38, 40, 42 and 44 that four magnetic poles, for example, are produced in the rotor. I dispose stacked annular laminations 110 of magnetic material in an annular recess 108 in the interior of housing 10. The laminations 110 provide a magnetic path for the rotor flux to permit this flux to pass through the conductive cylinder 104.

As will be explained hereinafter, shaft 20 and shaft 94 may be connected to respective rotating devices to drive the respective rotor 26 and cylinder 104. When relative rotation occurs between rotor 26 and cylinder 104, eddy currents are generated in the cylinder owing to the relative motion between the cylinder and the rotor magnetic field. These generated eddy currents produce their own magnetic fields which are cut by the second winding including leg 67 when relative rotation exists. As the second winding moves through the eddy current magnetic field, voltages are induced in the legs 67, 68, 70 and 72 of the winding. The total voltage induced in the secondary winding is proportional to the difference in speed between shaft 20 and shaft 94.

My differential tachometer has many applications. In general, it provides an electrical signal which is proportional to the difference in rotational speed between a pair of shafts. If shaft 20 rotates in the direction of the the arrow A in Figure 1 at a given speed and shaft 94 rotates in the direction of the arrow B at a different speed, the output signal appearing at terminals 92 and 90 is proportional to the difference in speed between shaft 20 and shaft 94. As shaft 20 rotates, it carries the magnetic field in the winding including leg 38. If there is a difference in speed of rotation between shaft 20 and shaft 94, eddy currents are generated in the conductive cylinder 104. Owing to the difference in relative rotation between the shafts, the eddy-current-produced magnetic field cuts the conductors of the winding including leg 66 to induce a voltage in the winding proportional to the speed difference between the shafts. It will be appreciated that if no relative rotation exists between cylinder 104 and rotor 26, there will be no induced voltage.

If one shaft, for example shaft 20, is coupled to the input shaft of a servomechanism system and the other shaft 94 is coupled to the output shaft of the servomechanism system, my differential tachometer produces an electrical signal representing the true error rate of the servomechanism. I may readily determine the slip of an induction motor by coupling one of the shafts 20 or 94 to the induction motor shaft and by coupling the other shaft of my tachometer to a synchronous motor having a synchronous speed equal to the synchronous speed of the induction motor. The output signal at terminals 90 and 92 would be proportional to the induction motor slip. My differential tachometer may be made to function in an expanded-range, velocity servo system merely by coupling a synchronous motor of the approximate desired speed to one shaft. Such a system has a wide range owing to the output linearity of my tachometer over a wide range of speed.

It is to be understood that a direct current source such as a battery could be substituted for the generator 66 within the scope of my invention. With this substitution, my differential tachometer functions as an acceleration sensing device, the output voltage of which is proportional to the angular acceleration difference of rotor 26 and cylinder 104.

It will be seen that I have accomplished the objects of my invention. I have provided a differential tachometer which eliminates the necessity for employing two matched tachometers in many instances in the prior art. My tachometer may be used to generate the true error rate of a servomechanism. It may be used to determine the slip of an induction motor. Use of my tachometer permits assembly of a velocity servomotor system having a wide range. My tachometer is unitary, simple and compact in construction.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A differential tachometer including in combination a support, a first member, means mounting said first member for movement on said support, a second member, means mounting said second member for movement on said support, means carried by said first member for inducing eddy currents in said second member when said members move relative to each other and means carried by said first member for producing an electrical signal proportional to the magnitude of said eddy currents.

2. A differential tachometer as in claim 1 in which said means for inducing eddy currents includes magnetic flux generating means.

3. A differential tachometer as in claim 1 in which said means for producing an electrical signal includes a winding carried by said first member.

4. A differential tachometer as in claim 1 in which said eddy-current inducing means includes means for generating a magnetic flux and including means carried by said support for directing said flux to link said second member.

5. A differential tachometer including in combination a support, a rotor, means mounting said rotor for rotation on said support, a hollow conductive cylinder, means mounting said cylinder for rotation on said support adjacent said rotor, means carried by said rotor for inducing eddy currents in said cylinder when said cylinder and said rotor move relative to each other and means carried by said rotor for producing an electrical signal proportional to the magnitude of said eddy currents.

6. A differential tachometer as in claim 5 in which said means for producing eddy currents includes a first winding carried by said rotor and in which said electrical signal producing means includes a second winding carried by the rotor.

7. A differential tachometer as in claim 5 in which said means for producing eddy currents includes a first winding carried by said rotor and means for supplying alternating current potential to said first winding and in which said means for producing an electrical signal includes a second winding carried by said rotor.

8. A differential tachometer as in claim 5 in which said cylinder surrounds said rotor and including magnetic material carried by said support and surrounding said cylinder.

9. A differential tachometer including in combination a frame, a rotor, means for rotatably mounting said rotor on said frame, said rotor being formed with a plurality of slots, a first winding disposed in certain of said slots, a second winding disposed in other of said slots, means for energizing said first winding to produce a magnetic field, means forming a magnetic path for said magnetic field, said magnetic path including an annular air gap, a cylinder formed of conductive material, means for mounting said cylinder for rotation in said air gap and means for removing voltage generated in said second winding as the measure of the differential rotation between said rotor and said cylinder.

References Cited in the file of this patent

UNITED STATES PATENTS

| | | |
|---|---|---|
| 2,206,920 | Riggs | July 9, 1940 |
| 2,481,196 | Bulliet | Sept. 6, 1949 |
| 2,759,116 | Glass | Aug. 14, 1956 |